Oct. 21, 1969  E. R. BURDETT  3,474,257
TIMING CIRCUITS

Filed Dec. 11, 1967  2 Sheets-Sheet 1

United States Patent Office

3,474,257
Patented Oct. 21, 1969

3,474,257
TIMING CIRCUITS
Edward Raymond Burdett, Stafford, England, assignor to The English Electric Company Limited, London, England, a British company
Filed Dec. 11, 1967, Ser. No. 689,692
Claims priority, application Great Britain, Dec. 13, 1966, 55,805/66
Int. Cl. H03k 3/64
U.S. Cl. 307—107           5 Claims

ABSTRACT OF THE DISCLOSURE

This invention provides a timing circuit for producing, from an A.C. supply, an accurately timed D.C. current pulse which may be used for example to drive the operating coil of a circuit breaker. A three-phase supply is fed to three thyristors which are connected as a three-phase rectifier with the operating coil as load. The supply is fed to a pulse train generator which produces a continuous train of pulses all similarly phased relative to the supply. An operating signal energizes a timing circuit which gates the train of pulses from the pulse train generator to the control electrodes of the thyristors for a predetermined time interval. The operating coil is therefore energized with an accurately timed current pulse.

---

This invention relates to timing circuits.

According to this invention a timing circuit includes a plurality of thyristors having an alternating current input and having their outputs connected to provide a timed output signal, a pulse timing circuit responsive to the leading edge of an initiating pulse to produce a timing pulse of predetermined duration, and a gating circuit to which a train of pulses is fed and which allows pulses of this train to be supplied to said thyristors for the duration of said timing pulse, whereby pulses of said train energise said thyristors in sequence for the duration of said timing pulses, so as to produce a rectified alternating current timed output signal, which is initiated by a pulse of said train of pulses, and the duration of which is determined by that of said timing pulse.

Figure 1:
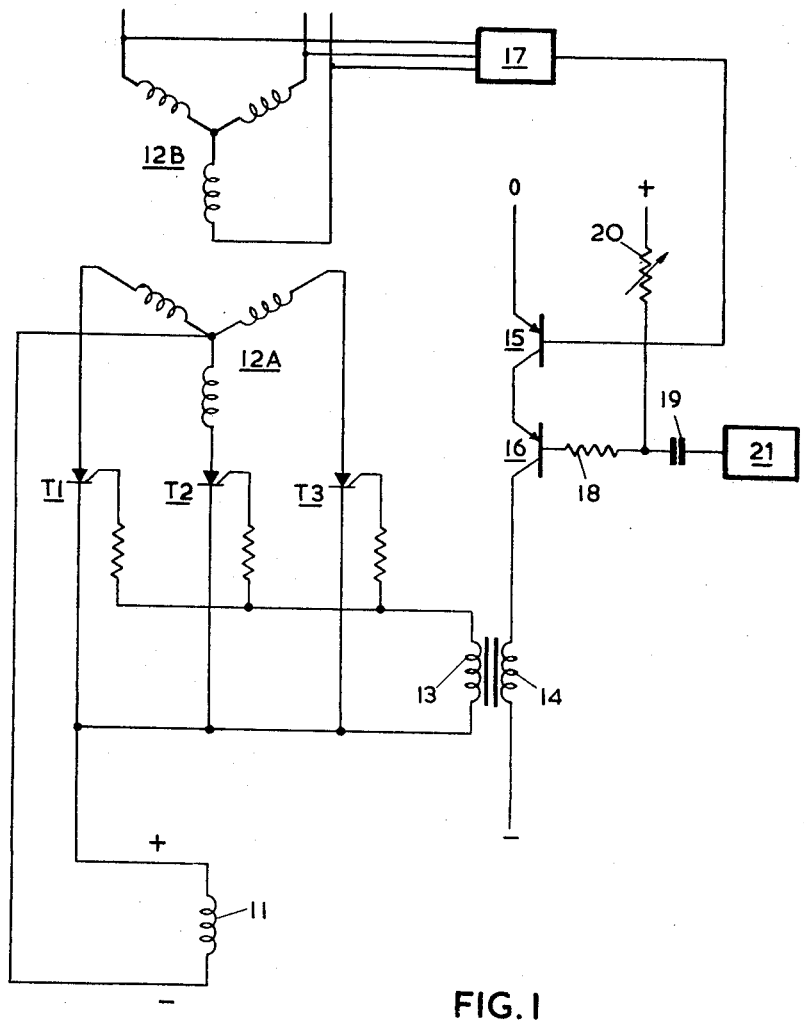
Figure 2:
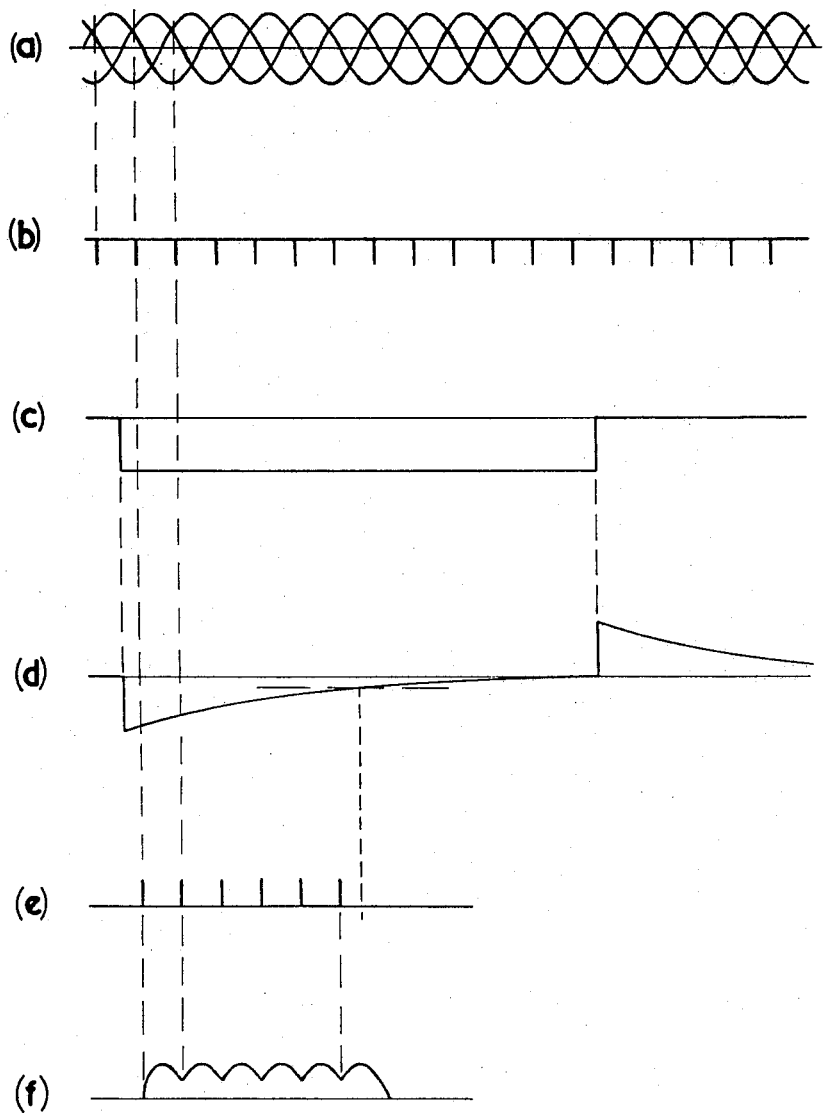

One embodiment of the invention will now be described by way of example with reference to the accompanying drawings, of which:

FIG. 1 is a circuit diagram of the pulse timing circuit, and FIGS. 2a to 2f illustrate wave-forms at different points in the circuit.

Referring to the drawings, the operating coil 11 of an actuator is connected between the neutral point of the star-connected secondary winding 12A of a transformer, of which the primary 12B is connected to a three-phase supply (FIG. 2a), and the common output of three thyristors T1, T2 and T3. The inputs of the latter are connected to the secondary 12A of the transformer, to provide a three-phase half-wave rectifier circuit, and the control electrodes of the thyristors are connected to the secondary 13 of a pulse transformer. The primary 14 of the pulse transformer is connected in series with transistors 15 and 16 which form a gating circuit. A train of pulses (FIG. 2b) is produced by a pulse-train circuit 17, all equally phased in relation to the power supply, so that three pulses are produced during each cycle of one phase of the power supply. These pulses are fed continuously to transistor 15. Transistor 16 is connected to a time delay network including resistor 18, capacitor 19, and variable resistor 20, and in its normal state transistor 16 is non-conducting due to the positive bias resulting from the variable resistor 20 being connected to a positive supply.

The unidirectional rectified A.C. pulse to the operating coil 11 should have an accurately timed start, and moreover its duration should be strictly limited in order to avoid damage to the coil.

To fire the thyristors T1, T2, T3, a long negative gating pulse (FIG. 2c) is produced by the pulse circuit 21, causing transistor 16 to conduct. The time constant of the network formed by resistor 18, capacitor 19, and variable resistor 20 is chosen so that the differentiated gating pulse (FIG. 2d) closes the gate within the required time, say 50 milliseconds, due to the charging of the capacitor 19 via the variable resistor 20. This ensures that transistor 16 ceases to conduct, even if both the phased train of pulses to transistor 15 and the gating pulse from circuit 21 are allowed to continue.

The thyristors T1, T2, T3 have their control electrodes energised by pulses (FIG. 2e) from the pulse transformer 13, 14, and start to conduct, at the moment of the first pulse of the phased train of pulses after the gating pulse from circuit 21 appears, each thyristor acting in effect as a grid-controlled half-wave rectifier. Thus the start of the rectified A.C. output signal (FIG. 2f) is accurately timed; the thyristors are energised in sequence by the pulses of the train supplied via transistor 15, phased at the appropriate part of the A.C. wave-form, for the duration of the timing pulse; and the thyristors stop conducting when transistor 16 ceases to conduct, thus limiting the duration of the output signal to the operating coil 11. Zero potential on transistor 16 is indicated by the horizontal broken line in FIG. 2d, the transistor having a small positive bias to ensure a well-marked cut-off at the end of the timing pulse.

The shape of the front edge of the output signal depends on the exact phase of the train of pulses in relation to the A.C. wave-form, the load represented by operating coil 11, and the reactance of transformer 12A, 12B.

It will be appreciated that as a result of the phasing of the pulses of the train, whichever rectifier is the first to fire, it can only do so at the correct part of the wave-form.

In an alternative, the phased train of pulses may be replaced with an unphased train of pulses of very much higher frequency, but in this case the start of the output signal will be determined by the start of the initiating or gating pulse. Whether this is important depends, for example, on the required power of the output signal over the period corresponding to a single half-cycle of the supply. Other variations in the circuit can also be made. For example, a three-phase bridge circuit using three diodes in addition to the three thyristors can be used instead of the half-wave rectifier configuration illustrated. Also, separate trains of phased pulses can be generated for each thyristor.

The circuit is particularly useful as the energising circuit for the operating coils of electromagnetic latch actuators (circuit breakers).

I claim:
1. A timing circuit including
   a plurality of thyristors having an alternating current input and having their outputs connected to provide a timed output signal,
   a pulse timing circuit responsive to the leading edge of an initiating pulse to produce a timing signal of predetermined duration,
   pulse generating means for producing a train of pulses, and
   gating circuitry which couples the pulse generating means to the thyristors and is controlled by the timing pulse to allow pulses of the train of pulses to be supplied to said thyristors for the duration of said timing pulse, whereby pulses of said train enable said thyristors to turn on in sequence for the duration of said timing pulse, so as to produce a rectified alternating current timed output signal, which is initiated by a pulse of said train of pulses, and the duration of which is determined by that of said timing pulse.

2. A timing circuit according to claim 1, wherein the pulses of said train of pulses are all equally phased in relation to the alternating current input.

3. A timing circuit according to claim 1, wherein the pulse repetition frequency of said train of pulses is high relative to the frequency of the alternating current input.

4. A timing circuit according to claim 1, wherein the alternating current input is a polyphase supply.

5. An electromagnetically operated circuit breaker system including a circuit breaker having an operating coil and a timing circuit according to claim 1 connected to drive the operating coil.

References Cited

UNITED STATES PATENTS

| | | | |
|---|---|---|---|
| 3,134,068 | 5/1964 | Feltman | 321—5 X |
| 3,281,645 | 10/1966 | Spink | 321—47 |
| 3,310,686 | 3/1967 | Valentine | 307—218 X |
| 3,392,319 | 7/1968 | McColl et. al. | 321—5 |
| 3,399,337 | 8/1968 | Stone | 321—5 |

ROBERT K. SCHAEFER, Primary Examiner

T. B. JOIKE, Assistant Examiner

U.S. Cl. X.R.

307—141, 206, 208, 252, 265; 317—148.5; 321—5